June 11, 1957 R. R. WILLIAMSON 2,795,376

COMPUTING UNIT FOR ADDITION AND MULTIPLICATION

Filed Aug. 17, 1951

INVENTOR
Robert R. Williamson
BY
Jennie, Edmonds, Morton, Barrows and Taylor
ATTORNEYS United States Patent Office 2,795,376

Patented June 11, 1957

2,795,376

COMPUTING UNIT FOR ADDITION AND MULTIPLICATION

Robert R. Williamson, Hoboken, N. J., assignor to Stevens Research Foundation, Hoboken, N. J., a corporation of New Jersey Application August 17, 1951, Serial No. 242,291

4 Claims. (Cl. 235—61)

This invention relates to digital computers and more particularly to a digital computer unit for performing the arithmetic operations of addition and multiplication, preferably on binary numbers. By means of properly chosen complementary apparatus the further operations of subtraction and division may also be performed. The invention provides a computing unit or element capable of discriminating among a number of states substantially in excess of two.

According to the invention a computing unit is formed of a summing amplifier together with a beam tube having a plurality of targets, one for each state to be distinguished in the output of the amplifier, and of appropriate input and output circuits. The input circuits apply or evaluate step voltages for application to the amplifier. The output circuits, which are connected to the targets, transform the excitation of the targets into a sum term and a carry term, or into the various final terms of a binary number. While the amplifier is subject to percentage errors, the beam tube is a digital device, and removes the errors of the amplifier, provided only these do not exceed a tolerable maximum. To add together a series of binary numbers each including a plurality of digits, one such unit is provided for each digit of the numbers to be added. Each unit is wired to associated storage apparatus to receive a particular digit from each of the numbers to be added. In this way all of the digital components of all the numbers to be added can be applied to the chain of units simultaneously. The only signal required to be passed from unit to unit is the carry term from one digital place to the next so that the complete addition can be performed in a very short time. The invention thus provides a computing unit or element of digital accuracy but capable of discriminating a large number of states. The unit of the invention therefore effects a substantial economy in components over a combination of bistable digital elements of equivalent capacity.

Multiplication of binary numbers is accomplished according to the invention by providing for each power of two in the final product one or more adding units according to the invention. Each of these units receives as inputs the intermediate cross products of a given power of two and sums them. The value of each cross product is zero or one and is determined by an appropriate circuit preceding the input to the summing amplifier in which the sum of all cross products of a given power of two is to be evaluated. The sum of the cross products is delivered by the unit as a sum term which is the coefficient in the final product of the power of two represented by the stage in question, and as a carry term which is injected directly into the summing amplifier of the stage for the next higher power of two.

The computing units of the invention may be employed for subtraction by adding to the minuend the complement of the subtrahend, with suitable provision for an end around carry. Subtraction according to this general method is described in High Speed Computing Devices by Engineering Research Associates, Inc., McGraw-Hill, 1950. See pages 87–89 and 280–284.

Computing units according to the invention may be employed for division by a process of test multiplication well known in the computer art. For each binary place in the dividend the divisor is multiplied by a test factor of unity. If the test product is found at that place, the quotient contains a unity term for that binary place. If the test product is not found, the quotient is zero at that binary place. Division according to this chain method is described in the above-identified work at pages 91–94.

The invention will now be described in detail with reference to the accompanying drawings in which.

Figure 1:
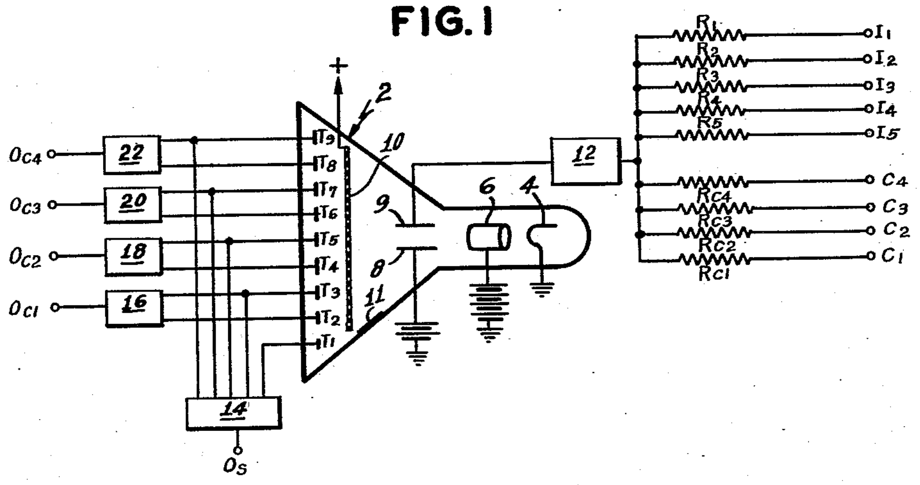
Fig. 1 is a diagram of an adding unit according to the invention shown partly in schematic and partly in block form.

A computing unit according to the invention is shown in Fig. 1. In the unit of Fig. 1 there is provided a cathode-ray beam tube generally indicated at 2 including a cathode 4, accelerating anode 6, deflection plates 8 and 9 and a plurality of target electrodes $T_1 \ldots T_9$. The number of target electrodes to be provided is a matter of choice governed by considerations of economy and accuracy which will be presently discussed. Nine target electrodes are a convenient number and have been shown in Fig. 1 as an example of a suitable number. The target electrodes are preferably made or coated with a material having a high degree of secondary emission, and an electron permeable screen 10 is disposed within the tube between the deflection plates and the target electrodes. The screen 10 and anode 6 are held at positive potentials with respect to the cathode. One of the deflection plates 8 is biased to a positive potential, and the other plate 9 receives various potentials from a summing amplifier 12 which has the property of providing an output voltage proportional to the sum of the voltages which are applied to it at a plurality of input terminals $I_1 \ldots I_5$ and $C_1 \ldots C_4$.

The target electrodes $T_1 \ldots T_9$ are disposed in a regular array across the face of the tube 2 so that with increasing positive potentials applied to the deflection plate 9 the electron beam is progressively deflected across the targets from $T_1$ to $T_9$. The tube may be provided with a supplementary electrode 11 on its conical face which receives the electron beam when the plate 9 is at minimum potential corresponding to zero input to the amplifier 12. An appropriate potential for the plate 9 to permit the electron beam to fall on electrode 11 may be provided by biasing means not shown which may for example form part of the amplifier 12.

When the electron beam in the tube 2 is caused by a signal from the amplifier 12 to fall on one of the electrodes $T_1 \ldots T_9$, the electrode bombarded is brought to a positive potential by virtue of the excess of secondary electrons emitted by it and collected at the screen electrode 10. The positive potential so produced is communicated to one of the logical Or circuits 16, 18, 20 or 22 and, in the case of odd numbered target electrodes, to the Or circuit 14 as well. Thus input connections lead from the odd numbered targets to circuit 14 and from targets $T_2$ and $T_3$ to circuit 16, from $T_4$ and $T_5$ to circuit 18, from $T_6$ and $T_7$ to circuit 20 and from $T_8$ and $T_9$ to circuit 22. The Or circuit or circuits energized produce a positive output voltage at their output terminals $O_{C1}$ . . . $O_{C4}$ and $O_S$.

The summing amplifier 12 has its input connected to a plurality of resistors $R_1$ . . . $R_5$ which lead to summing input terminals $I_1$ . . . $I_5$ respectively and to additional input resistors $R_{C1}$ . . . $R_{C4}$ leading to input terminals $C_1$ . . . $C_4$. The resistors $R_1$ . . . $R_5$ are of the same value and are intended to receive at the summing input terminals $I_1$ . . . $I_5$ uniform step voltages of either zero or unity value representative of digits in the numbers to be added. The resistors $R_{C1}$ . . . $R_{C4}$ are preferably of graduated value, $R_{C2}$ having half the value of $R_{C1}$ and $R_{C3}$ and $R_{C4}$ having respectively one-third and one-fourth the value of $R_{C1}$. $R_{C1}$ has preferably the same value as $R_1$ . . . $R_4$. Resistors $R_{C1}$ . . . $R_{C4}$ are provided to receive at the terminals $C_1$ . . . $C_4$ uniform step voltages of zero or unity value representing carry terms from the preceding stage in a computer comprising a plurality of computing units such as that shown in Fig. 1 for the addition of multidigit numbers. These carry voltages are derived from the terminals $O_{C1}$ . . . $O_{C4}$ of the preceding stage, as will be explained with reference to Fig. 6.

A unit amplitude step voltage applied to terminal $C_1$ produces the same unit excitation of amplifier 12 as a unit step voltage applied to any one of $R_1$ . . . $R_5$. A unit step voltage representing a carry of two applied to $C_2$ provides through the half value resistor $R_{C2}$ a double excitation of amplifier 12, and so on.

The Or circuits 14, 16, 18, 20 and 22 have the property that they produce an output voltage of uniform amplitude upon receipt of a suitably dimensioned step voltage on any one or more of their input terminals.

The operation of the digital adding unit of Fig. 1 may now be explained. Upon the application of a unit step voltage to any one of the summing input terminals $I_1$ . . . $I_5$ or of a unit voltage to the input carry terminal $C_1$, the amplifier 12 will be energized to produce an output signal of such amplitude that the electron beam will be brought from the collector electrode 11 to target electrode $T_1$. Energization of $T_1$ applies an appropriately dimensioned unit positive signal to Or circuit 14 so that an output signal appears at terminal $O_S$. The sum of unit input to the unit of Fig. 1 is therefore unity at $O_S$, with no carry term. If input signals are simultaneously received at two of the terminals $I_1$ . . . $I_5$, or at one of $I_1$ . . . $I_5$ and at $C_1$, or at $C_2$, the beam will be brought to fall on $T_2$. The sum two (in decimal notation) is written 10 in binary notation so that the output signal at $O_S$ is zero, whereas a single carry voltage is developed at $O_{C1}$ by the Or circuit 16 which is connected to $T_2$. If on the other hand the sum of the inputs to the adding unit of Fig. 1 is three (in decimal notation), the beam will be brought to target $T_3$, and the unit will produce a unit output signal at $O_S$ in addition to a unit carry voltage at $O_{C1}$. Similarly input signals of total value four, whether made up of four unit signals at four of the terminals $I_1$ . . . $I_5$ or of a unit signal to $C_3$ and one unit signal to one of $I_1$ . . . $I_5$, will bring the electron beam to rest on $T_4$, producing a unit output signal at $O_{C2}$ and zero signal at $O_S$. With nine target electrodes the unit is capable of counting to nine, which is registered as unit output at $O_S$ plus a unit carry signal at $O_{C4}$. The unit signal at $O_{C4}$ is adapted to be perceived as of the value four at a quarter value resistor $R_{C4}$ of a succeeding stage.

The unit is preferably designed to have unity gain between its input terminals $I_1$ . . . $I_5$, $C_1$ . . . $C_4$ and its output terminals $O_S$, $O_{C1}$ . . . $O_{C4}$.

By providing a unit such as that shown in Fig. 1 for each binary place in a group of binary numbers to be added, and by combining therewith suitable input storage and output storage devices, one may produce a computer for addition, developing at the output terminal $O_S$ of each unit the coefficient of the power of two to which the unit pertains.

The unit of Fig. 1 may be provided with any desired number of digital input terminals I and with any desired number of carry input terminals C. The beam tube 2 must however have as many targets T as the sum of its input terminals I and the value of its highest carry input terminal C. The number of targets so to be provided is determined by the number of states to be discriminated. In adding $n$ binary quantities, regardless of the number of significant figures in each, the largest number of states to be discriminated at any binary place is $2n-1$. As $n$ increases, the demands upon the accuracy of the system increase, for example with regard to the size of the input step voltages, with regard to the linearity of the amplifier 12 and with regard to spacing of the target electrodes in the beam tube. In order for the adding unit to provide perfect accuracy in the performance of its adding function, it is necessary that the combined errors of the input voltages, summing amplifier, etc., shall not exceed the fraction of full beam deflection represented by the reciprocal of the number of targets in the tube. This limitation will insure that the beam will always fall upon a proper target. If by way of example a maximum tolerable error in beam deflection of 10 percent is assumed, we have $$\frac{1}{2n-1}>.1$$

or $$2n-1<10;\ 2n<11$$

and $$n=5$$

Accordingly with units employing nine-target tubes, five quantities can be added simultaneously. If the quantities are single digit binary numbers, the unit of Fig. 1 provides for their addition directly. When they are multidigit numbers, a chain of such units is provided, one for each of the digits in the numbers to be added.

Figure 2:
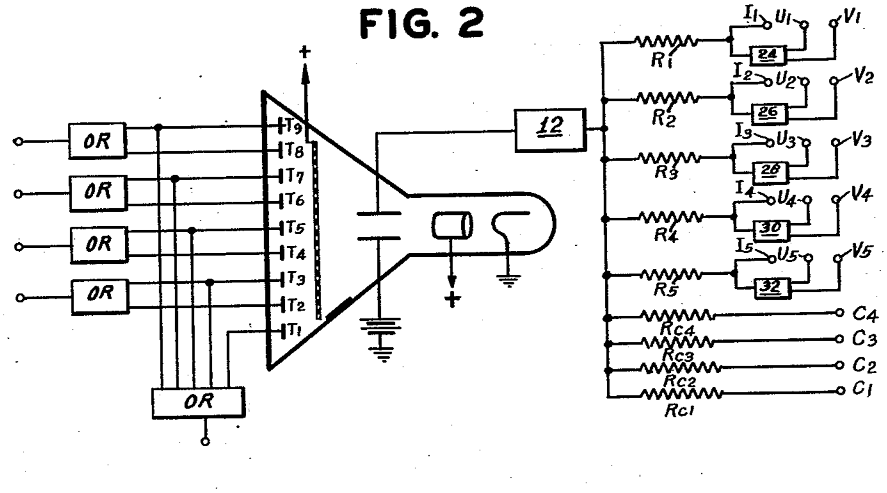
Fig. 2 is a diagram of a unit similar to that of Fig. 1 but modified to facilitate its use in the operation of multiplication.

Fig. 2 shows a computing unit according to the invention especially adapted to the operation of multiplication. In the unit of Fig. 2 the summing input terminals $I_1$ . . . $I_5$ are paralleled by factor terminals $U_1$ . . . $U_5$ and $V_1$ . . . $V_5$. Terminals $U_1$ and $V_1$ work into a logical And circuit 24 whose output is applied to the digital input resistor $R_1$ in the same manner as an input for addition applied at $I_1$. Similar and circuits 26, 28, 30 and 32 provide for the simultaneous evaluation of four further two-factor products and for the summation of these products. Summing input terminals $I_1$ . . . $I_5$ may be retained to render the unit of Fig. 2 useful for both addition and multiplication. The operation of the unit of Fig. 2 will be described in connection with the unit of Fig. 7.

Figure 3:
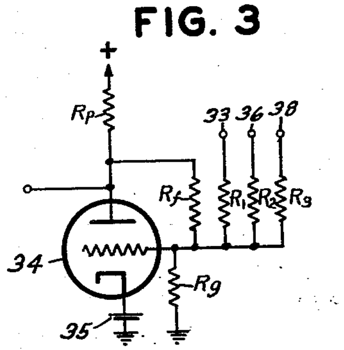
Fig. 3 is a schematic diagram of a summing amplifier suitable for use in the units of Figs. 1 and 2.

Fig. 3 shows in schematic form a single tube summing amplifier suitable for use as the amplifier 12 of Figs. 1 and 2. The summing amplifier is an amplifier having degenerative feedback from plate to grid, so adjusted that the plate voltage variations are proportional to the variations in current flowing toward the grid through two or more input resistors, to which the voltages to be summed are applied. This means proportionality to the sum of the voltages applied to the input resistors when these resistors are the same, or proportionality to the sum of those voltages each adjusted for the value of its input resistor, when different. The summing amplifier then provides a means of generating a voltage proportional to the sum of a number of step voltages, and by control of the size of the input resistors the worth of individual voltages in the sum can be multiplied. The summing amplifier of Fig. 3 is composed of a triode 34 having a grid leak resistor $R_g$ and a plate-to-grid feedback resistor $R_f$. The plate is returned to a source of positive potential through a suitable plate load resistor $R_p$. The tube is operated at a negative bias as by means of the cathode battery 35, so as to draw no grid current. $R_g$ is a high resistance, and $R_f$ is of substantially smaller value. The tube should preferably have a high gain. A series of input resistors $R_1$, $R_2$ and $R_3$ lead from input terminals 33, 36, and 38 to the grid. These are of the same order of magnitude as the feedback resistor $R_f$. The voltages across the input resistors $R_1$, $R_2$ and $R_3$ are $$i_1R_1=e_1-e_g$$

$$i_2R_2=e_2-e_g$$

$$i_3R_3=e_3-e_g$$

The voltage across the feedback resistor is $$i_pR_f=e_p-e_g$$

where $e_p$ is the plate voltage and $i_p$ the feedback current. But $$e_p=-\mu e_g$$

where $\mu$ is the voltage gain of the tube, and $$e_p-e_g=-e_g(\mu+1)$$

The current $i$ in the grid leak (relatively constant) is:

$$i=i_1+i_2+i_3+i_p=\frac{e_g}{R_g}$$

Then $$e_g\left(\frac{1}{R_g}+\frac{1+\mu}{R_f}+\frac{1}{R_1}+\frac{1}{R_2}+\frac{1}{R_3}\right)=\frac{e_1}{R_1}+\frac{e_2}{R_2}+\frac{e_3}{R_3}$$

$$e_p=-\mu e_g=-\mu\left(\frac{e_1}{R_1}+\frac{e_2}{R_2}+\frac{e_3}{R_3}\right)\frac{1}{\frac{1}{R_g}+\frac{1+\mu}{R_f}+\frac{1}{R_1}+\frac{1}{R_2}+\frac{1}{R_3}}$$

If $\mu$ is large $$e_p\approx-\frac{\mu R_f}{1+\mu}\left(\frac{e_1}{R_1}+\frac{e_2}{R_2}+\frac{e_3}{R_3}\right)$$

$$\approx-R_f\left(\frac{e_1}{R_1}+\frac{e_2}{R_2}+\frac{e_3}{R_3}\right)$$

When the input resistors are of the same value R $$e_p\approx-\frac{R_f}{R}(e_1+e_2+e_3)$$

If $R_2$ is one-half $R_1$, a unit voltage $e_2$ produces as much change in $e_p$ as two unit voltages $e_1$.

Figure 4:
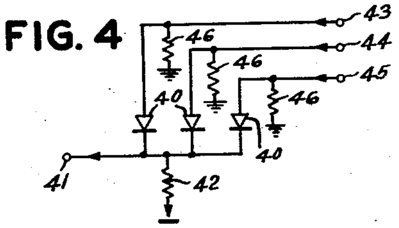
Fig. 4 is a schematic diagram of a logical Or circuit suitable for use in the unit of Fig. 1.

The computing unit of the invention employs logical Or circuits to develop from the excitation of the cathode-ray beam tube both the sum and carry voltages appropriate to the stage in which the unit is employed, whether for multiplication or addition. As stated in connection with Fig. 1 the characteristic of the logical Or circuit is that with unit signal applied to any one or more of its two or more input terminals, it will develop a unit output signal (not necessarily of the same amplitude). Fig. 4 shows a schematic digaram of a form of Or circuit suitable for use in the invention. A plurality of crystal diodes 40 are connected with their non-conducting poles brought to a common point 41 which serves as output terminal for the circuit. The terminal 41 is connected through a resistor 42 to a negative potential, and the conducting poles of the diodes are connected to separate input terminals 43, 44 and 45. These input terminals may be returned to ground through resistors 46. Resistors 46 are small compared to resistor 42 so that the voltage level of the output terminal 41 is close to ground in the absence of an input signal. If any one of the input terminals is raised to a voltage above ground, the output terminal 41 will be raised to nearly the same voltage as that applied at the input terminal since the diode in series with that terminal has a low resistance to conduction toward the resistor 42. The other diodes will of course be cut off. Thus a positive signal applied to any one or more of the input terminals results in a positive output signal. There may be an unlimited number of input terminals, each provided with its own diode. The parameters of the circuit of Fig. 1 are so adjusted that the positive potential to which the target electrodes in the beam tube are brought by the electron beam is large by comparison with the no signal negative voltage of the output terminals of the Or circuits connected to those targets.

Figure 5:
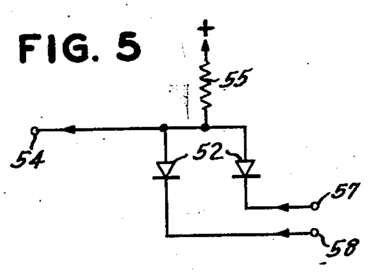
Fig. 5 is a schematic diagram of a logical And circuit suitable for use in the unit of Fig. 2.

The modification of the computing unit of the invention shown in Fig. 2 employs logical And circuits to develop the product of two binary factors each of whose value is either zero or unity. The value of the product is accordingly zero unless the value of both factors is unity. Fig. 5 shows a form of circuit having this characteristic suitable for use in each of the And circuits 24, 26, 28, 30 and 32 of Fig. 2. Two crystal diodes 52 have their conducting poles connected to an output terminal 54 which is returned to a source of positive voltage through a resistor 55. The non-conducting poles of the diodes are connected to input terminals 57—58. In the absence of a positive signal at either of the terminals 57 and 58, the output terminal 54 will rest at a voltage somewhere above ground determined by the relative values of resistor 55 and of the paths to ground through the input terminals 57 and 58, which are connected through appropriate step signal generating devices. The application of a positive voltage to either of the input terminals 57 and 58 alone leaves the output terminal 54 nearly undisturbed. If however a positive voltage is applied to both of the terminals 57 and 58, the output voltage at 54 will rise by an amount slightly greater than the positive voltage so applied. In use the step voltages applied are so dimensioned that when positive voltages are applied to both input terminals the change in voltage of the output terminal 54 is an order of magnitude higher than that occurring when a positive voltage is applied to one input terminal only.

The computing unit of the invention can be used for multiplication by virtue of the fact that in the product of two numbers the coefficient of each power of the number base in the product is derived from the sum of a series of terms each of which terms is itself the product of two coefficients of properly selected powers of the base present in the numbers being multiplied together. Since in binary numbers these "factor coefficients," i. e. coefficients of the powers of two in the numbers being multiplied together, can have only the values of zero or unity, the value of a product of two such factor coefficients can also have only a value of zero or unity. The computing unit of the invention as shown in Fig. 1, with the addition of logical And circuits at its summing input terminals as shown in the embodiment of Fig. 2 can therefore be employed to develop the coefficients of the powers of two present in the product of two binary numbers.

Since the computing units of the invention will be customarily employed in groups, the manner in which the individual circuit elements are combined into physically distinguishable units is subject to variation according to the designer's choice. Thus for example the carry input resistors $R_{C1}$ . . . $R_{C4}$ could be as well physically associated with the output terminals of the Or circuits 16, 18, 20 and 22 of Figs. 1 and 2 so that the units would deliver carry voltages of graduated magnitude according to the value of the carry term. Moreover other methods of distinguishing between carry terms of various values can be employed, for example attenuators within the Or circuits 16, 18, 20 and 22 themselves.

I claim:

1. A computing unit comprising a summing amplifier, a cathode-ray beam tube including a plurality of target electrodes disposed in an array, means to deflect the cathode-ray beam in said tube over said target electrodes in a known order, means coupling the output of said amplifier to said beam deflecting means, a logical Or circuit having input terminals connected to the odd numbered target electrodes in said order, and a plurality of logical Or circuits each having input terminals connected to two successive target electrodes in said order beginning with the second target electrode.

2. A computing unit comprising a summing amplifier, a plurality of summing input resistances of uniform value connected to the input of said amplifier, a plurality of carry input resistances of value graduated in inverse arithmetical ratio from the value of said summing resistances, said carry input resistances being connected to the input of said amplifier, a plurality of logical And circuits each having its output connected to one of said summing input resistances, a cathode-ray beam tube including a plurality of secondarily emissive target electrodes equal in number to the number of said summing input resistances plus the reciprocal of the value of the smallest of said carry input resistances expressed as a fraction of the value of said summing resistances, beam deflecting means associated with said tube and adapted to deflect the cathode-ray beam in said tube over said target electrodes in a known order, means coupling the output of said amplifier to said beam deflecting means, a logical Or circuit connected to the odd numbered target electrodes in said order, and a plurality of logical Or circuits each connected to two target electrodes successively numbered in said order.

3. A computing device comprising an electron beam tube including a plurality of target electrodes disposed in an array within said tube and means to deflect the beam of said tube successively over said electrodes, a logical Or circuit coupled to the odd numbered electrodes in said array, a plurality of logical Or circuits each coupled to two successive electrodes in said array, a plurality of resistors of uniform value having separate input terminals and a common output terminal, a plurality of logical And circuits each having its output terminal connected to the input terminal to one of said resistors of uniform value, a plurality of resistors of graduated value having separate input terminals and having said common output terminal as their common output terminal, and a summing amplifier having its input connected to said common output terminal and having its output coupled to the beam deflection means of said tube.

4. A computing unit comprising an amplifier tube having such degenerative feedback that the plate voltage thereof is substantially proportional to the sum of the currents flowing toward its control grid, a cathode-ray beam tube including a plurality of target electrodes disposed in an array over the face thereof and beam deflecting means adapted to deflect the beam thereof over said target electrodes in a known order, means to couple the output of said amplifying tube to said beam deflecting means, a logical Or circuit connected to those of said target electrodes having odd ordinal numbers in said order, and a plurality of logical Or circuits each connected to two target electrodes bearing successive ordinal numbers in said order.

References Cited in the file of this patent

UNITED STATES PATENTS

| | | |
|---|---|---|
| 2,057,773 | Finch | Oct. 20, 1936 |
| 2,224,677 | Hanscom | Dec. 10, 1940 |
| 2,401,779 | Swartzel et al. | June 11, 1946 |
| 2,516,752 | Carbrey | July 25, 1950 |
| 2,597,360 | Moon | May 20, 1952 |
| 2,627,587 | Kohler | Feb. 3, 1953 |
| 2,692,727 | Hobbs et al. | Oct. 26, 1954 |

FOREIGN PATENTS

| | | |
|---|---|---|
| 978,717 | France | Nov. 29, 1950 |
| 857,806 | France | Apr. 25, 1940 |